Dec. 15, 1964     R. W. PINNES     3,161,381
SUPERSONIC INTERMITTENT-POWERED LOW-ALTITUDE INCLINED BODY
Filed March 17, 1960     2 Sheets—Sheet 1

Inventor
ROBERT W. PINNES
By R. J. Tompkins
Attorney

ROBERT W. PINNES

United States Patent Office 3,161,381
Patented Dec. 15, 1964

3,161,381
SUPERSONIC INTERMITTENT-POWERED LOW-ALTITUDE INCLINED BODY
Robert W. Pinnes, 4421 Faroe Place, Rockville, Md.
Filed Mar. 17, 1960, Ser. No. 15,770
2 Claims. (Cl. 244—75)
(Granted under Title 35, U.S. Code (1952), sec. 266)

The invention described herein may be manufactured and used by or for the Government of the United States of America for governmental purposes without the payment of any royalties thereon or therefor.

The present invention relates to a method and to control apparatus therefor for securing relatively high lift-to-drag ratios in the flight of an inclined body or wing at supersonic speeds at low altitudes and more particularly to the provision of a controlled flight path for increasing the range of a flying body proceeding at supersonic speeds at low altitudes.

Thus an object of the present invention is to cause a flying vehicle to fly an "up-and-down" path rather than a "straight-and-level" path.

Another object is to provide for automatic application of intermitten power to a vehicle flying at low altitudes at supersonic speeds whereby the vehicle is flow at an angle of attack greater than its design value during the power-on phase and is allowed to glide during the power-off phase.

A further object of the present invention is to obtain longer ranges of flight from inclined bodies or wings flying at supersonic speeds at low altitudes by the use of intermittent power and an "up and down" flight path.

Still a further object of the present invention is to secure for an inclined body flying at supersonic speeds and low altitudes an increase in altitude at a minor fuel penalty.

Other objects and many of the attendant advantages of this invention will be readily appreciated as the same becomes better understood by reference to the following detailed description when considered in connection with the accompanying drawings wherein.

Figure 1:
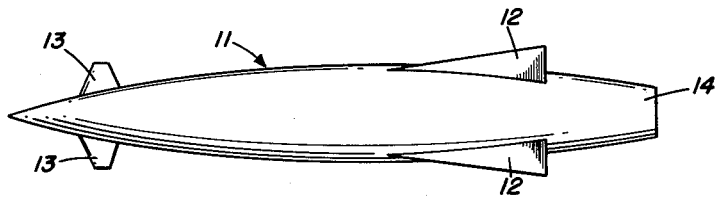
FIG. 1 is a plan view of a vehicle configuration representative of a flying inclined body.
Figure 2:
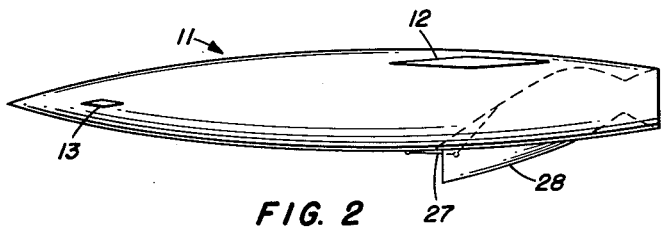
FIG. 2 is a side view of the flying inclined body of FIG. 1.

Referring now to the drawings, vehicle 11 is designed primarily as a flying inclined body for performance at supersonic speeds at low altitudes (below 10,000 feet). Due to the high dynamic pressures acting upon a vehicle flying under these conditions conventional wings which would add to the volume of the vehicle (and thereby further decrease the body density) have been replaced by the much smaller arrow-like wings 12, 12. In spite of the use of the term "wings," these surfaces (wings 12, 12) serve primarily as control rather than lift surfaces. Up front, vehicle 11 has canard surfaces 13, 13 which also provide control while power plant 14 placed at the rear supplies the motive power.

From a military aspect it is highly desirable to send a plane or missile toward a target at high speed and at low atitude from the standpoint of diminishing detection and vulnerability. Therefore in spite of the fact that vehicle 11 as designed is an inefficient configuration from an aerodynamic point of view, it never-the-less has military utility. To elaborate, from an aerodynamic standpoint the combination of high dynamic pressure acting upon vehicle 11 traveling at supersonic speeds at low altitudes and the relatively low body density of the vehicle results in a very low value of lift coefficient ($C_L$). This, of course, means that the angle of attack ($\alpha$) has a very low value and that the lift-to-drag ($L/D$) is relatively poor as well.

Figure 3:
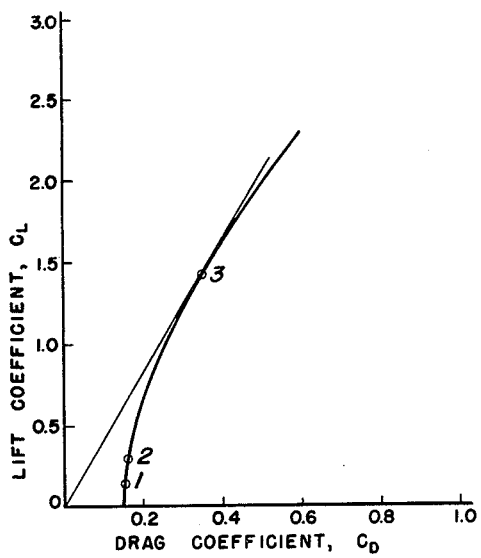
FIG. 3 is a typical graphic plot of lift coefficient ($C_L$) vs. drag coefficient ($C_D$)
Figure 4:
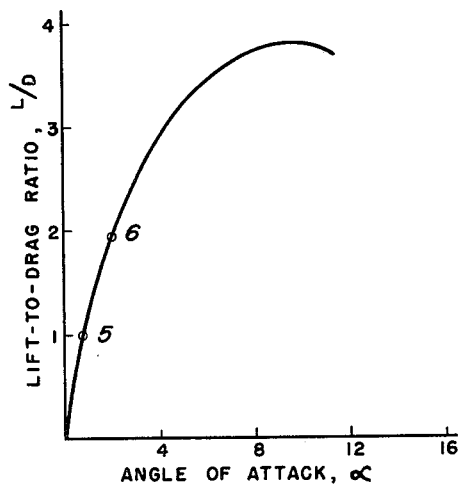
FIG. 4 is a typical graphic plot to lift-to-drag ratio ($L/D$) vs. angle of attack ($\alpha$)
Figure 5:
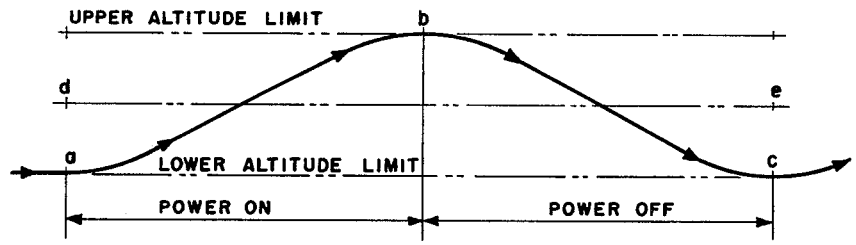
FIG. 5 is a schematic representation of the desired flight path.

Typical "design points" for a vehicle such as vehicle 11 when flying straight-and-level at supersonic speeds at low altitudes is shown in FIGS. 3 and 4 at points 1 and 5. These design points 1 and 5 disclose operation at a very low value of lift coefficient ($C_L$) and at a very low value of angle of attack ($\alpha$) giving an indication of the inefficientcy dictated by the severe conditions of speed and altitude. However, accepting these conditions as rigid limitations, the practice of the present invention never-the-less provides means for substantially increasing ($C_L$) and thereby extending the range of vehicle 11. Thus, it is proposed to use intermittent power. During the power-on phase shown as that part of the curve of FIG. 5 between points $a$ and $b$ vehicle 11 is flown at an angle of attack greater than the design value represented on the curve of FIG. 4 by point 5. The new value of $\alpha$ is represented by point 6 and examination of the position of point 6 relative to point 5 will indicate that a better value of $L/D$ will result. This improved value of $L/D$ will have resulted from a large increase in $C_L$ relative to the increase in $C_D$ as shown by point 2 of FIG. 3 which represents the value corresponding to the increased $\alpha$ of the power-on phase. The specific value of $\alpha$ selected will seek a balance between $L/D$ and $C_D$, in other words, a better value of $L/D$ is desired up to the optimum value of $L/D$ designated as point 3 but the increase in $C_D$ with this increase in $LD/$ must be kept within limits.

Operating at the $\alpha$ of point 6 rather than the design $\alpha$ of point 5 will cause vehicle 11 to climb since a lift force greater than the weight of vehicle 11 is produced. Since the climb force is the result of better $L/D$ and since $C_D$ has been increased only minutely due to the slope of the curve of FIG. 3 there will be only a minor fuel penalty for the increased altitude obtained during the flight from $a$ to $b$. When the maximum desired altitude has been reached (in this case point $b$), the power is cut-off and vehicle 11 is put through a zero-$g$ push-over. The vehicle is then allowed to glide down at best $L/D$ to the minimum desired altitude as at point $c$. Having reached this minimum altitude, the power is turned on and the climb phase of the flight is repeated. As a result vehicle 11 will fly an "up-and-down" path as the cycle is repeated between two altitudes about 400' apart. The actual values for the minimum and maximum altitudes would be a subject of analysis relative to the particular mission.

The major advantage of this invention is that it will permit vehicle 11 to attain significantly greater ranges at low altitudes and supersonic speeds as compared to straight-and-level flight at some nominal altitude between the maximum and minimum altitudes of the up-and-down path.

Figure 6:
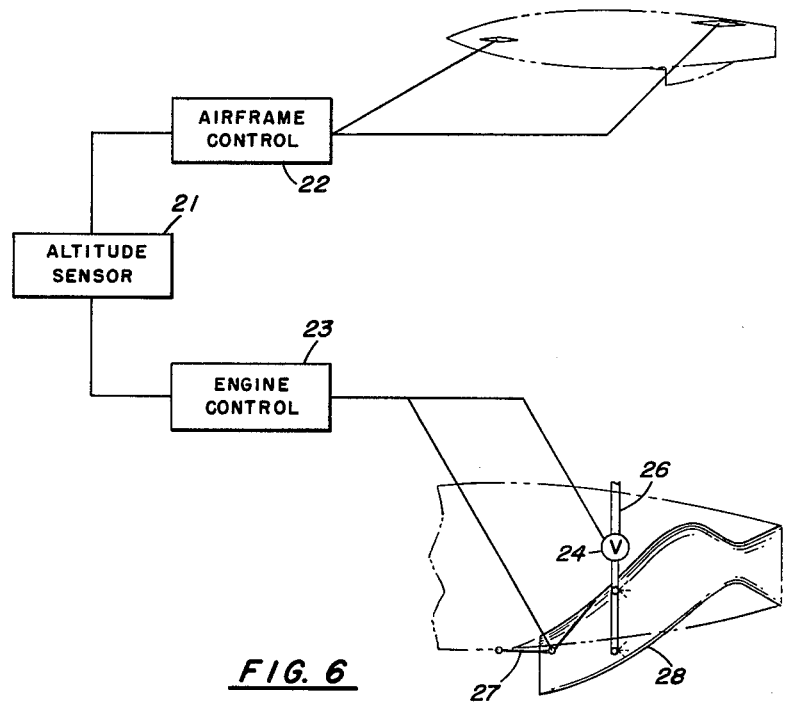
FIG. 6 is a schematic showing the control means for effectuating an "up-and-down" flight path and provide intermittent power.

FIG. 6 is a schematic representation of one embodiment of control apparatus to automatically fly vehicle 11 in an "up-and-down" flight path. Altitude sensor 21 in vehicle 11 is set to react when certain altitudes are reached; namely, the upper altitude limit and the lower altitude limit. After the initial launching stage of the inclined body, vehicle 11, the operation is cyclic. Thus, when the preset lower altitude is reached as in FIG. 5 at point $a$, altitude sensor 21 sends signals to airframe control 22 and engine control 23. Airframe control 22 will put vehicle 11 into a climbing attitude using wings 12, 12 and canard 13, 13. At the same time, engine control 23 will adjust valve 24 to fix the rate of fuel flow supplied by fuel flow line 26 and, if necessary, the variable inlet geometry 27 of engine 28 will be adjusted automatically thereby. Also, although not shown in FIG. 6 engine 28 may be provided with a variable geometry exhaust nozzle which would in such case also be adjusted automatically by engine control 23. These adjustments of fuel flow rate and engine variable geometry would provide the optimum conditions to sustain the climb flight path $a$–$b$.

When vehicle 11 has been launched or has climbed to the pre-set upper altitude limit as, for example, when point $b$ (FIG. 5) is reached, altitude sensor 21 again sends signals to airframe control 22 and engine control 23. Airframe control 22 then puts vehicle 11 into a descending attitude by the use of the control surfaces and, at the same time, engine control 23 determines the requisite fuel flow rate by adjusting valve 24 thereby fixing the rate of fuel flow from fuel flow line 26. Variable inlet geometry 27 will also be adjusted automatically thereby. The engine fuel flow rate during the descending phase may be zero, some idling fuel flow rate or whatever fuel flow rate is desirable for the particular engine and fuel employed. However, the significant point is that the fuel flow will always be lower during the descending phase (from point $b$ to point $c$, FIG. 5) than the fuel rate for the climbing phase. In this way vehicle 11 is able to travel the horizontal distance from point $d$ to point $e$ with the expenditure of less fuel (theoretically, as little as one-half as much fuel) than if vehicle 11 had traversed this distance in straight-and-level flight under the same operating conditions; namely supersonic flight at low altitude.

When vehicle 11 reaches the pre-set lower altitude limit (point $c$) the entire cycle is repeated and this operation continues throughout the low altitude cruise phase of the flight.

The exact up-and-down flight path selected would depend on a specific analysis of the airframe and engine combination. Thus, a ram jet engine using pyrophoric fuel would be one of the types of engines best applicable to the intermittent power, up-and-down flight path of the present invention. Another possibility is the use of any jet power plant having the requisite thrust capabilities and instead of cutting power completely off during the "power-off" phase simply switching the engine to essentially an "idling" position whereby the inclined body overcomes its own drag but produces no net thrust.

Application of the present invention to either manned or unmanned vehicles is proposed and in the case of manned vehicles it can readily be seen that, if desired, altitude sensor 21 can be eliminated and airframe control 22 and engine control 23 can be operated by the pilot. Also, the entire control system can be supplanted by the pilot but as a practical matter the faster the flight and the lower the altitudes employed for flight the more necessary automatic control becomes to avoid the danger of running into the ground due to the inadequate reaction time of the pilot.

Obviously many modifications and variations of the present invention are possible in the light of the above teachings. It is therefore to be understood that within the scope of the appended claims the invention may be practiced otherwise than as specifically described.

What is claimed is:

1. A method for increasing the range of a low density inclined body traveling at supersonic speeds below an altitude of 10,000 feet above sea level comprising the steps of flying at the conventional design angle of attack for the inclined body at some lower altitude limit, controlling said inclined body to increase the angle of attack to a value giving optimum increase in lift-to-drag ratio for minimum increase in drag coefficient, climbing at least 200 feet to some upper altitude limit, cutting off the power, gliding said inclined body at the best lift-to-drag ratio down to said lower altitude limit, turning on the power and continuing the cycle of climbing, cutting the power, gliding and turning on the power between said lower and upper altitude limits to completion of the mission.

2. A method for increasing the range of a low density inclined body traveling at supersonic speeds below an altitude of 10,000 feet above sea level comprising the steps of launching the inclined body to some lower altitude limit, increasing the angle of attack to greater than the conventional design angle of attack to a value giving optimum increase in lift-to-drag ratio for minimum increase in drag coefficient, climbing at least 300 feet to some upper altitude limit, cutting off the power, gliding said inclined body at the best lift-to-drag ratio down to said lower altitude limit, turning on the power and continuing the cycle of climbing, cutting the power, gliding and turning on the power between said lower and upper altitude limits to completion of the mission.

References Cited by the Examiner

UNITED STATES PATENTS

| 2,415,092 | 2/47 | Frische et al. | 244—77 |
| 2,677,513 | 5/54 | Kliever | 244—77 |

OTHER REFERENCES

Encyclopaedia Britannica; Vol. 10; William Brenton, publisher; Encyclopaedia Britannica Inc.; pages 428–429; "Gliding"; 1957.

MILTON BUCHLER, *Primary Examiner*.

SAMUEL BOYD, ARTHUR M. HORTON, *Examiners*.